3,232,768
METHOD OF MAKING SOFT UNRIPENED CURD CHEESES
Wilhelmine H. van Wieren, Syracuse, and Joseph C. Langberg, Peterboro, N.Y., assignors to The Borden Company, New York, N.Y., a corporation of New Jersey
No Drawing. Filed May 5, 1961, Ser. No. 107,913
2 Claims. (Cl. 99—162)

This invention relates to soft, unripened curd cheese with improved keeping quality and to the method of making it, and has particular reference to the manufacture of creamed cottage cheese.

Soft, unripened curd cheese, such as cottage cheese and creamed cottage cheese, are very perishable and have a limited keeping quality due to their susceptibility to bacterial, yeast, and mold spoilage. Creamed cottage cheese also is subject to oxidative rancidity of the fat. At present, it is necessary to employ rigorous sterilization procedures on the equipment used to make such cheese and also to hold it at temperatures below 40° F. in order to prevent microbial spoilage and oxidative changes. Even so, the keeping quality and storage life of the cheeses is limited.

It has now been found that such cheeses can be prepared which have greatly improved keeping qualities and shelf life and which at the same time retain a uniform flavor.

Briefly stated, the present invention comprises washing the soft, unripened curd cheese with an aqueous solution of a source of chlorine dioxide, followed by addition of a yeast and mold inhibitor to the washed curd.

The invention also comprises, in the case of creamed cottage cheese, high heat treatment of the cream mix and addition of an antioxidant thereto.

The invention further comprises the resultant storage stable cheese.

Conventional procedures are used in the manufacture of the soft, unripened curd cheese up to the time the curd is washed. Thus, either an acid curd, made without rennet, or a rennet-curd, combined action of starter culture and rennet, cottage cheese can be made using either the short-setting or long-setting procedures. The curd is then cut, heated, and the whey removed therefrom.

In conventional procedures the curd is washed after removal of the whey. This is done in order to firm and harden the curd to the touch and also to remove any whey that may remain in the curd since the whey would adversely affect the flavor of the cottage cheese. Ordinarily several washings with water are carried out with the curd being soaked in the wash water for a period of time, usually 10–20 minutes, and then drained free of the water. Two to three washings are ordinarily used with the last washing usually containing water at a cooler temperature, 40° F. or lower.

In accordance with the present invention a source of chlorine dioxide is added to the wash water and a yeast and mold inhibitor to the washed curds to prevent the growth of any contaminating organisms and the further growth of the organisms in the starter culture. The conventional soaking time of the curd in the wash water is not altered. The result is a marked increase in the keeping quality of the cottage cheeses.

The use of a source of chlorine dioxide in the wash water without the subsequent addition of the yeast and mold inhibitor to the curds does not give satisfactory results. In like manner the use of only the yeast and mold inhibitor is also unsatisfactory. It is necessary that both be used to obtain the increased keeping quality and uniform flavor.

The source of chlorine dioxide is added preferably to all of the wash waters, although, if desired, and several wash waters are to be used, the first wash water only need contain a source of chlorine dioxide. Addition of the source of chlorine dioxide to the first wash water appears to be more effective than addition to subsequent wash water because of the higher temperature and lower pH.

After the last wash water has been drained from the curd the yeast and mold inhibitor is added to the curds. In preparing creamed cottage cheese the inhibitor is preferably added to the cream mix to be admixed with the curds.

The curd may then be salted, or left unsalted, and packaged for use. In some instances the curd may be refrigerated prior to packaging.

It has also been found that the storage stability of the creamed cottage cheese can be greatly improved if the cream mix is heated to a temperature ranging from 145° F. for 30 minutes to 300° F. for 1 second, ordinarily 180° F. for 20 minutes, prior to admixing with the cheese curd. It is preferred to add a food antioxidant to the cream mix in addition to the heat treatment, in order to obtain the prolonged keeping quality.

It is also desirable to pack the creamed cottage cheese in such manner that oxygen is excluded. This can be done either by the use of gas packing in an atmosphere of nitrogen, or carbon dioxide, vacuum packing, or by filling the container with cheese so as to permit no head space.

Oxidative changes in the butter fat in the creaming mix are prevented or retarded by the high heat treatment, with or without the addition of an antioxidant, and/or packing in the absence of oxygen.

As to materials, soft, unripened curd cheese made by any conventional process may be used. Also used is any conventional cream mix employed to make creamed cottage cheese. Examples of such cheeses and mixes are set forth in pages 382 to 404 of the Van Slyke and Price text "Cheese," published by Orange Judd Publishing Company, Inc., of New York, New York (1952).

The chlorine dioxide that is used is any commerically available source of chlorine dioxide, preferably a stabilized form, a water soluble chlorite, such as sodium chlorite, or other available source of chlorine dioxide that is safe for use in foods.

The yeast and mold inhibitor used is selected from the group consisting of sorbic acid, potassium sorbate, sodium sorbate, sodium propionate, calcium propionate, sodium benzoate, calcium benzoate, mixtures thereof, and other commercially available inhibitors commonly used in foods. Sorbic acid and potassium sorbate are the preferred inhibitors.

The antioxidant that can be used in the cream mix in preparation of creamed cottage cheese includes nordihydroguaiaretic acid, propyl gallate, butylated hydroxyanisole, ethyl gallate, and commercially available food antioxidants that are mixtures of the above listed antioxidants and may have synergists added thereto. A specific example is a propylene glycol solution of butylated hydroxyanisole with propylgallate and citric acid.

Satisfactory proportions of the chlorine dioxide are about 10–1,000 parts per million (p.p.m.) and normally 15–200 p.p.m. in the wash water. Higher proportions may be employed but they are economically unsuitable.

The proportion of yeast and mold inhibitor added to the curd corresponds, for 100 parts by weight of the curd, to about 0.01–0.1 part by weight and preferably 0.05–0.075 part by weight.

The amount of antioxidant added to the cream mix is about 0–300 p.p.m., based on 100 parts by weight of the cream mix, and ordinarily about 10–50 p.p.m.

The treatment of the cottage cheese curds as outlined above prevents spoilage due to bacteria, yeasts and molds and acts to prolong the shelf life of the cottage cheese without affecting the flavor of the cheese. In the case of the creamed cottage cheese the treatment also acts to prevent fat deterioration caused by oxidative changes in the butter fat as well as by attack by microorganisms.

The invention will be further illustrated by description in connection with the following specific examples of the practice of it and in these examples and elsewhere herein proportions are expressed as parts by weight unless specifically stated to the contrary.

EXAMPLE 1

Cottage cheese curd, washed in the usual manner with three wash waters containing 7.5 p.p.m. $Cl_2$ from sodium hypochlorite, was divided into two equal portions and creamed. The cream mix for both portions were identical with the exception that one of the cream mixes contained 0.075% sorbic acid. The cheeses were packed and stored at 47°–50° F. and periodically tested for microbial growth. The results were as follows:

Table 1

| Weeks | No Additions | 0.075% Sorbic Acid |
|---|---|---|
| 0 | 415 | 170 |
| 1 | 3,600,000 | 130,000 |
| 2 | (No counts taken) | |
| 3 | [1] 200,000,000 | [2] 2,600,000 |
| 4 | [1] 320,000,000 | [2] 28,000,000 |

[1] All slimy, mold on surface.
[2] All slimy, no mold on surface.

EXAMPLE 2

Cottage cheese curd was made as in Example 1 and washed with three wash waters, each containing 7.5 p.p.m. $Cl_2$ from hypochlorite. The curd was drained, divided in half and creamed, with one portion of the curd creamed with a mix containing 0.05% sorbic acid. The results were as follows:

Table 2

| Weeks | 7.5 p.p.m. $Cl_2$ From NaOCl | |
|---|---|---|
| | No Sorbic Acid | 0.050 Sorbic Acid |
| 0 | 7,400 | 6,000 |
| 1 | 800,000 | 700,000 |
| 2 | 410,000 | 720,000 |
| 3 | 800,000 | (No count taken) |
| 4 | [1] 550,000 | [2] 600,000 |

[1] All samples covered with heavy black mold; large number of coliforms.
[2] No mold detected after 5 weeks; no coliforms.

EXAMPLE 3

Cottage cheese curd was made in the usual manner and divided into two equal portions. One portion was given three washings in water containing 100 p.p.m. chlorine dioxide and the other three washings in water containing 15 p.p.m. chlorine dioxide. Each of these portions, when drained, was in turn divided into two equal parts, all of which were creamed. Two portions of the cream mix contained 0.075% sorbic acid. The cheeses were packaged, stored at 47°–50° F. and periodically tested for spoilage. The results are set forth in Table 3.

Table 3

| Weeks | 100 p.p.m. $ClO_2$ | | 15 p.p.m. $ClO_2$ | |
|---|---|---|---|---|
| | No Sorbic Acid | 0.075% Sorbic Acid | No Sorbic Acid | 0.075% Sorbic Acid |
| 0 | 1,500 | 1,600 | 12,000 | 9,000 |
| 1 | 230 | 230 | 9,800 | 6,600 |
| 2 | 140 | 200 | 3,000,400 | 4,600 |
| 3 | 80 | 170 | 5,200,000 | 2,100 |
| 4 | 200 | 160 | [2] 15,000,000 | 3,100 |
| 5 | [1] xx | 210 | | 12,000 |
| 6 | | <100 | | 16,000 |
| 7 | | 270 | | 190,000 |

[1] No count possible; surface completely covered with mold.
[2] Surface completely covered with mold.

Creamed cottage cheeses made by washing the curd with 200 p.p.m. chloride dioxide and adding 0.075% sorbic acid to the cream mix were found to be edible after 13 weeks with no slimy surface growth or mold contamination. There was a development of rancidity in the samples that had no antioxidant added or in which the cream had not been given high heat treatment.

The foregoing examples illustrate the unexpected superiority of the use of both a source of chlorine and a yeast and mold inhibitor over the use of either alone. Further, the prolonged storage life of the cheeses of the instant invention make it desirable to provide against oxidation of cream in the cream mix.

It will be understood that it is intended to cover all changes and modifications of the examples of the invention herein chosen for the purpose of illustration which do not constitute departures from the spirit and scope of the invention.

We claim:

1. The method of improving the keeping quality of creamed cottage cheese comprising washing the curds with an aqueous solution containing 10–1,000 p.p.m. of a source of chlorine dioxide, draining said curds, and mixing said curds with a creaming mix containing up to 300 p.p.m., based on 100 parts by weight of the creaming mix, of a food grade antioxidant, and 0.05–0.075 part by weight of a yeast and mold inhibitor for every 100 parts by weight of the creamed curd.

2. The method of improving the keeping quality of creamed cottage cheese comprising washing the curds with an aqueous solution containing 15–200 p.p.m. of stabilized chlorine dioxide, draining said curds, and mixing said curds with a creaming mix containing 10–50 p.p.m., for every 100 parts by weight of the creaming mix, of a propylene glycol solution of butylated hydroxyanisole with propyl gallate and citric acid, and 0.05–0.075 part by weight, for every 100 parts by weight of the creamed curd, of sorbic acid.

References Cited by the Examiner

UNITED STATES PATENTS 2,546,568　3/1951　Taylor _____ 99—154
2,701,781　2/1955　Guevara _____ 167—17
2,974,046　3/1961　Perry et al. _____ 99—162

A. LOUIS MONACELL, Primary Examiner.

ABRAHAM H. WINKELSTEIN, Examiner.